United States Patent
Arora et al.

(10) Patent No.: US 8,557,444 B2
(45) Date of Patent: Oct. 15, 2013

(54) MULTI-LAYER ARTICLE COMPRISING POLYIMIDE NANOWEB

(75) Inventors: Pankaj Arora, Chesterfield, VA (US); Stephane Francois Bazzana, Wilmington, DE (US); T. Joseph Dennes, Parkesburg, PA (US); Eric P. Holowka, Philadelphia, PA (US); Lakshmi Krishnamurthy, Wilmington, DE (US); Stephen Mazur, Wilmington, DE (US); Glen E. Simmonds, Avondale, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 339 days.

(21) Appl. No.: 12/899,801

(22) Filed: Oct. 7, 2010

(65) Prior Publication Data

US 2011/0143207 A1 Jun. 16, 2011

Related U.S. Application Data

(60) Provisional application No. 61/286,618, filed on Dec. 15, 2009.

(51) Int. Cl.
| | |
|---|---|
| *H01M 2/16* | (2006.01) |
| *H01M 4/131* | (2010.01) |
| *H01M 4/583* | (2010.01) |
| *H01M 4/64* | (2006.01) |

(52) U.S. Cl.
USPC .................. 429/249; 429/231.3; 429/231.8; 429/233

(58) Field of Classification Search
USPC ............... 429/326, 232, 144, 94, 249, 231.3, 429/231.8, 233; 427/327; 428/304.4
See application file for complete search history.

(56) References Cited

U.S. PATENT DOCUMENTS

| | | | |
|---|---|---|---|
| 6,447,958 B1 * | 9/2002 | Shinohara et al. | ............ 429/248 |
| 7,112,389 B1 | 9/2006 | Arora et al. | |
| 7,422,623 B2 | 9/2008 | Ekiner et al. | |
| 2003/0152835 A1 * | 8/2003 | Dasgupta et al. | ............ 429/232 |
| 2004/0166311 A1 | 8/2004 | Yang et al. | |
| 2005/0067732 A1 | 3/2005 | Kim et al. | |
| 2006/0234031 A1 * | 10/2006 | Takata et al. | ............... 428/304.4 |

(Continued)

FOREIGN PATENT DOCUMENTS

| | | |
|---|---|---|
| EP | 2037029 | 3/2009 |
| JP | 4189827 | 7/1992 |

(Continued)

OTHER PUBLICATIONS

Ojeda et al, "Physical and Chemical Evolution of PMDA-ODA During Thermal Imidization" Journal of Polymer Science: Part B: Polymer Physics, vol. 32, 559-569 (1995).

(Continued)

*Primary Examiner* — Kenneth Douyette

(57) ABSTRACT

This invention provides a multi-layer article comprising a first electrode material, a second electrode material, and a porous separator disposed between and in contact with the first and the second electrode materials, wherein the porous separator comprises a nanoweb consisting essentially of a plurality of nanofibers of a fully aromatic polyimide. Also provided is a method for preparing the multi-layer article, and an electrochemical cell employing the same. A multi-layer article comprising a polyimide nanoweb with enhanced properties is also provided.

11 Claims, 10 Drawing Sheets

(56) References Cited

U.S. PATENT DOCUMENTS

| | | | |
|---|---|---|---|
| 2007/0207692 A1* | 9/2007 | Ono et al. | 442/327 |
| 2008/0045638 A1* | 2/2008 | Chapman et al. | 524/425 |
| 2008/0057390 A1* | 3/2008 | Kondo et al. | 429/144 |
| 2008/0241645 A1* | 10/2008 | Pinnell et al. | 429/94 |

FOREIGN PATENT DOCUMENTS

| | | |
|---|---|---|
| JP | 05-62893 | 9/1993 |
| JP | 2004/307625 A1 * | 11/2004 |
| JP | 2004-308031 | 11/2004 |
| JP | 2005-19026 | 1/2005 |
| WO | 2008/018656 | 2/2008 |
| WO | 2008/018657 | 2/2008 |

OTHER PUBLICATIONS

Nah et al, "Charcteristics of polyimide ultrafine fibers prepared through electrospinning", Polymer International, 52:429-432 (2003).

Mazur et al, "Electrochemistry of Aromatic Polyimides" J. Electrochem. Soc.: Electrochemical Science and Technology, Feb. 1987.

Li et al, "High Strength Electrospun Nanofibers Made From Rigid Rod Like Polyimide", College of Chem. & Chem. Engi., Jiangxi Normal University, University, Nanchang, 330022, China.

C.E. Sroog, "Polyimides", Encyclopedia of Polymer Science and Technology.

Chen et al "Mechanical Characterization of Single High-Strength Electrospun Polyimide Nanofibres" Journal of Physics D: Applied Physics, 41 (2008) 025308 (8 PP).

Huang et al, High-Strength Mats from electrospun Poly(p-Phenylene Biphenyltetracarboximide) Nanofibers:, Adv. Materials 2006, 18, 668-671.

Claudius Feger, "Curing of Polyimides", Polymer Engineering and Science, Mid-Mar. 1989, vol. 29, No. 5.

Kang Xu, "Nonageous Liquid Electrolyties for Lithium-Based Rechargeable Batteries" Chem. Rev. 2004, 104, 4303-4417.

Sheng Shui Zhang, "A review on electrolyte additives for lithium-ion batteries", Journal of Power Sources 162 (2006) 1379-1394.

* cited by examiner

MULTI-LAYER ARTICLE COMPRISING POLYIMIDE NANOWEB

FIELD OF THE INVENTION

This invention is directed to the application of nanoweb polyimide separators in lithium (Li) and lithium-ion (Li-ion) batteries as well as in other electrochemical cells.

BACKGROUND OF THE INVENTION

An important practical aspect of modern energy storage devices is ever-increasing energy density and power density. Safety has been found to be a major concern. Lithium ion cells currently in wide-spread commercial use are among the highest energy density batteries in common use and require multiple levels of safety devices, including external fuses and temperature sensors, that shut down a cell in case of overheating before a short circuit can occur as a result of the mechanical failure of the battery separator. Lithium-ion (Li-ion) batteries are also subject to explosion and fire should a short circuit occur because of mechanical or thermal failure of the separator. Li-ion secondary batteries present special challenges concerning durability over many cycles of charge and discharge. Commercially available Li-ion batteries typically employ microporous polypropylene as a battery separator. Microporous polypropylene begins to shrink at 120° C., limiting the battery fabrication process, the use temperature of the battery, and the power available from the battery.

In both fabrication and use, the wound electrochemical devices common in the marketplace impose severe mechanical stressing on the device separator. Those stresses can result in manufacturing defects and device failure. The mechanical stresses can include, for example, strong tension and compression of the separator during manufacture which are used to generate tight winding. After manufacture is complete, the device layers remain under compaction and tensile stress. Further, the manufactured device can be subject to shaking and impact stresses during use.

The requirements for choosing an improved separator for Li-ion batteries and other high energy density electrochemical devices are complex. A suitable separator combines good electrochemical properties, such as high electrochemical stability, charge/discharge/recharge hysteresis, first cycle irreversible capacity loss and the like, with good mechanical aspects such as strength, toughness and thermal stability.

Investigations concerning known high performance polymers for use as battery separators have been undertaken. One such class of polymers has been polyimides.

The *Handbook of Batteries*, David Lindon and Thomas Reddy, ed., McGraw-Hill, ($3^{rd}$ edition), 2002, describes first cycle discharge capacity loss as an important criterion in secondary batteries (P. 35.19). Also stated is that non-woven separators have been found in general to exhibit inadequate strength for use in Li and Li-ion batteries. (P. 35.29). For this reason, low-melting polyethylene microporous films tend to be used as separators in Li and Li-ion batteries. However, polyethylene microporous films are not thermally suited to the high temperatures occasionally associated with rapid discharge end uses, or end uses in high temperature environments.

Huang et al., Adv. Mat. DOI: 10.1002/adma.200501806, disclose preparation of a mat of polyimide nanofibers by electrospinning a polyamic acid that is then imidized to a polymer represented by the structure.

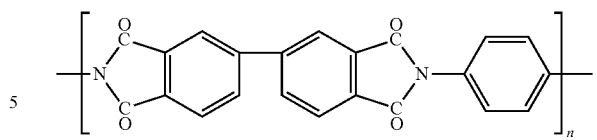

The mat so prepared is then heated to 430° C. and held for 30 minutes, thereby producing an increase in strength. No mention is made of battery separators.

Kim et al., U.S. Published Patent Application 2005/0067732, discloses a process for preparing polymeric nanowebs by electroblowing of polymer solutions, including polyimide solutions. No mention is made of battery separators.

Honda et al., JP2004-308031A, discloses preparation of polyimide nanowebs by electrospinning polyamic acid solution followed by imidization. Utility as a battery separator is disclosed.

Nishibori et al., JP2005-19026A, discloses the use of a polyimide nanoweb having sulfone functionality in the polymer chain as a separator for a lithium metal battery. The polyimide is described as soluble in organic solvents and the nanoweb is prepared by electrospinning polyimide solutions. No actual battery is exemplified. Heating of the nanoweb to about 200° C. is disclosed.

Jo et al., WO2008/018656 discloses the use of a polyimide nanoweb as battery separator in Li and Li-ion batteries.

EP 2,037,029 discloses the use of a polyimide nanoweb as battery separator in Li and Li-ion batteries.

A need nevertheless remains for Li and Li-ion batteries prepared from materials that combine good electrochemical properties, such as high electrochemical stability, charge/discharge/recharge hysteresis, first cycle irreversible capacity loss and the like, with good mechanical aspects such as strength, toughness and thermal stability.

SUMMARY OF THE INVENTION

In one aspect, this invention provides a multi-layer article comprising a first electrode material, a second electrode material, and a porous separator disposed between and in contact with the first and the second electrode materials, wherein the porous separator comprises a nanoweb that comprises a plurality of nanofibers wherein the nanofibers consist essentially of a fully aromatic polyimide.

In another aspect, this invention provides an electrochemical cell comprising a housing having disposed therewithin, an electrolyte, and a multi-layer article at least partially immersed in the electrolyte; the multi-layer article comprising a first metallic current collector, a first electrode material in electrically conductive contact with the first metallic current collector, a second electrode material in ionically conductive contact with the first electrode material, a porous separator disposed between and contacting the first electrode material and the second electrode material; and a second metallic current collector in electrically conductive contact with the second electrode material, wherein the porous separator comprises a nanoweb that comprises a plurality of nanofibers wherein the nanofibers consist essentially of a fully aromatic polyimide.

In another aspect, this invention provides a method of fabricating a nanoweb by assembling nanofibers to form a nanoweb wherein the nanofibers comprise a polyamic acid; imidizing the polyamic acid nanofibers at a selected temperature to provide a nanoweb comprising polyimide nanofibers;

and subjecting the nanoweb to a temperature at least 50° C. higher than the selected temperature for a period of time in the range of about 5 seconds to about 20 minutes.

DESCRIPTION OF THE INVENTION

Figure 1:
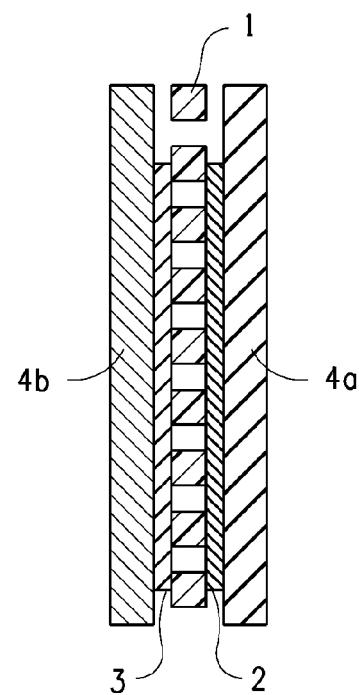
FIG. 1 is a schematic depiction of one embodiment of the multi-layer article hereof.

For the purposes of the present invention, the abbreviations and designations shown in Table 1, consistent with the practice in the polyimide art, will be employed:

TABLE 1

| Abbreviation | Chemical Name | Chemical Structure |
| --- | --- | --- |
| PMDA | Pyromellitic Dianhydride | PMDA |
| BPDA | Biphenyltetracarboxylic Dianhydride | BPDA |
| ODA | Oxydianiline | ODA |
| RODA | 1,3-bis(4-aminophenoxy)benzene | RODA |
| PDA | 1,4 Phenylenediamine | PDA |

TABLE 1-continued

| Abbreviation | Chemical Name | Chemical Structure |
|---|---|---|
| TDI | 2,4-toluene diisocyanate and 2,6 toluene diisocyanate | |
| MDI | Methylene diphenyl 4,4'-diisocyanate | |
| BTDA | 3,3',4,4'-benzophenone tetracarboxylic dianhydride | |

It shall be understood that other dianhydrides and other diamines, not listed in Table 1, are also suitable for use in the present invention, with the proviso that suitable dianhydrides and diamines are consistent with the limitations described infra.

An essential attribute of a practical separator for a Li-ion battery is that it maintain a high degree of mechanical integrity under conditions of use. Without sufficient mechanical integrity in the separator, the battery may not only cease operating, but indeed could short circuit and explode. Polyimides are well-known to be strong and chemically inert under a wide variety of circumstances. However, many polyimides when subject to common electrolyte solvents exhibit undesirably high solvent uptake with a concomitant degradation in strength and toughness. In extreme cases, the polymer may simply dissolve. A battery separator is of course insulating and thus non-conductive.

The article of the invention comprises a polyimide nanoweb separator that exhibits desirably high strength and toughness, desirably low solvent absorption, and desirably high strength retention after solvent exposure compared to the polyimide nanoweb separators of the art. The polyimide nanoweb separator further exhibits desirable electrochemical stability and performance. The polyimide nanoweb separator suitable for the practice of this invention includes a plurality of nanofibers wherein the nanofibers consist essentially of a fully aromatic polyimide. The polyimide separator suitable for use in the invention exhibits electrolyte uptake below 20% by weight after 1300 hours of exposure. The polyimide nanoweb separators of the art comprise non-fully aromatic nanofibers, according to the definition infra, and are found to exhibit more than twice the amount of solvent uptake and concomitantly greater property degradation.

The invention further provides an electrochemical cell that comprises the article of the invention, namely the polyimide nanoweb separator hereof as the separator between a first electrode material and a second electrode material.

The invention provides a method for enhancing the properties of the polyimide nanoweb separators suitable for use in the present invention by subjecting the polyimide nanoweb to a temperature at least 50° C. higher than the imidization temperature thereof for a period of 5 seconds to 20 minutes. The resulting nanoweb is stronger and less solvent absorbent than the same nanoweb before treatment.

For the purposes of the present invention, the ISO 9092 definition of the term "nonwoven" article shall be used: "A manufactured sheet, web or batt of directionally or randomly orientated fibres, bonded by friction, and/or cohesion and/or adhesion, excluding paper and products which are woven, knitted, tufted, stitch-bonded incorporating binding yarns or filaments, or felted by wet-milling, whether or not additionally needled. The fibres may be of natural or manufactured origin. They may be staple or continuous filaments or be formed in situ." The term "nanoweb" as employed herein represents a subset of nonwoven articles wherein the fibers are designated "nanofibers" that are characterized by cross-sectional diameters of less than 1 micrometer. The nanowebs employed herein define a planar structure that is relatively flat, flexible and porous, and is formed by the lay-down of one or more continuous filaments.

The term "nanofibers" as used herein refers to fibers having a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension. The nanofibers employed in this invention consist essentially of one or more fully aromatic polyimides. For example, the nanofibers employed in this invention may be prepared from more than 80 wt % of one or more fully aromatic polyimides, more than 90 wt % of one or more fully aromatic polyimides, more than 95 wt % of one or more fully aromatic polyimides, more than 99 wt % of one or more fully aromatic polyimides, more than 99.9 wt % of one or more fully aromatic polyimides, or 100 wt % of one or more fully aromatic polyimides.

Nanowebs can be fabricated by a process selected from the group consisting of electroblowing, electrospinning, and melt blowing. The nanowebs employed in the specific embodiments presented infra have been prepared by electroblowing. Electroblowing of polymer solutions to form a nanoweb is described in some detail in Kim et al., op.cit.

As employed herein, the term "fully aromatic polyimide" refers specifically to polyimides that are at least 90% imidized and wherein at least 95% of the linkages between adjacent phenyl rings in the polymer backbone are effected either by a covalent bond or an ether linkage. Up to 25%, preferably up to 20%, most preferably up to 10%, of the linkages may be effected by aliphatic carbon, sulfide, sulfone, phosphide, or phosphone functionalities or a combination thereof. Up to 5% of the aromatic rings making up the polymer backbone may have ring substituents of aliphatic carbon, sulfide, sulfone, phosphide, or phosphone. 90% imidized means that 90% of the amic acid functionality of the polyamic acid precursor has been converted to imide. Preferably the fully aromatic polyimide suitable for use in the present invention is 100% imidized, and preferably contains no aliphatic carbon, sulfide, sulfone, phosphide, or phosphone.

Polyimide nanowebs suitable for use in this invention are prepared by imidization of the polyamic acid nanoweb where the polyamic acid is a condensation polymer prepared by reaction of one or more aromatic dianhydride and one or more aromatic diamine. Suitable aromatic dianhydrides include but are not limited to pyromellitic dianhydride (PMDA), biphenyltetracarboxylic dianhydride (BPDA), and mixtures thereof. Suitable diamines include but are not limited to oxydianiline (ODA), 1,3-bis(4-aminophenoxy)benzene (RODA), and mixtures thereof. Preferred dianhydrides include pyromellitic dianhydride, biphenyltetracarboxylic dianhydride, and mixtures thereof. Preferred diamines include oxydianiline, 1,3-bis(4-aminophenoxy)benzene and mixtures thereof. Most preferred are PMDA and ODA.

In the polyamic acid nanoweb imidization process hereof, the polyamic acid is first prepared in solution; typical solvents are dimethylacetamide (DMAC) or dimethyformamide (DMF). In one method suitable for the practice of the invention, the solution of polyamic acid is formed into a nanoweb by electroblowing, as described in detail, infra. In an alternative method suitable for the practice of the invention, the solution of polyamic acid is formed into a nanoweb by electrospinning as described in Huang et al., op.cit. In either case, it is necessary that the nanoweb be formed from the polyamic acid solution, and the resulting nanoweb then subject to imidization. Unlike the solvent-soluble polyimides employed in the art in the nanoweb separators of electrochemical cells of the art, the fully aromatic polyimides employed in this invention are highly insoluble. The practitioner of the art could choose to electroblow or electrospin a solution of the polyimide or a solution of the polyamic acid followed by imidization. The practitioner of the present invention must first form the nanoweb from the polyamic acid, followed by imidization of the nanoweb thus formed.

Imidization of the polyamic acid nanoweb so formed may conveniently be performed by first subjecting the nanoweb to solvent extraction at a temperature of ca. 100° C. in a vacuum oven with a nitrogen purge; following extraction, the nanoweb is then heated to a temperature of 300 to 350° C. for about 10 minutes or less, preferably 5 minutes or less, more preferably 30 seconds or less, to fully imidize the nanoweb. Imidization according to the process hereof results in at least 90%, preferably 100%, imidization. Under most circumstances, analytical methods show that 100% imidization is rarely achieved, even after long imidization times. For practical purposes, complete imidization is achieved when the slope of the percentage imidization vs. time curve is zero.

In one embodiment, the polyimide nanoweb consists essentially of polyimide nanofibers formed from pyromellitic dianhydride (PMDA) and oxy-dianiline (ODA), having monomer units represented by the structure,

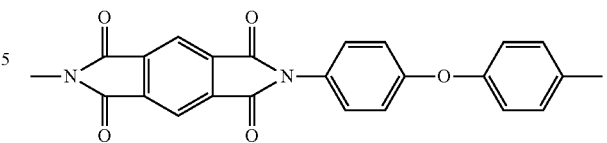

I

Polyimides are typically referred to by the names of the condensation reactants that form the monomer unit. That practice will be followed herein. Thus, the polyimide consisting essentially of monomer units represented by structure I is designated PMDA/ODA.

While the invention hereof is not limited thereby, it is believed that the method of polymerization can affect the polyimide behavior in electrolyte solutions as well. Stoichiometric configurations that allow for excess dianhydride result in polyimides with amine end groups. These amine end groups have active hydrogens which can interact with electrolyte solutions. By adjusting the stoichiometry to have a slight excess of dianhydride or by end-capping the amines with monoanhydrides, such as phthallic anhydride, those active hydrogens are deactivated, thereby reducing interaction with the electrolyte solution.

In one aspect, the invention provides a multi-layer article comprising a first electrode material, a second electrode material, and a porous separator disposed between and in contact with the first and the second electrode materials, wherein the porous separator comprises a nanoweb that includes a plurality of nanofibers wherein the nanofibers consist essentially of a fully aromatic polyimide. In one embodiment, the first and second electrode materials are different, and the multi-layer hereof is useful in batteries. In an alternative embodiment, the first and second electrode materials are the same, and the multi-layer article hereof is useful in capacitors, particularly in that class of capacitors known as "electronic double layer capacitors."

In one embodiment, the first electrode material, the separator, and the second electrode material are in mutually adhering contact in the form of a laminate. In one embodiment the electrode materials are combined with polymers and other additives to form pastes that are adheringly applied to the opposing surfaces of the nanoweb separator. Pressure and/or heat can be applied to form an adhering laminate.

In one embodiment wherein the multi-layer article of the invention is useful in lithium ion batteries, a negative electrode material comprises an intercalating material for Li ions, such as carbon, preferably graphite, coke, lithium titanates, Li—Sn Alloys, Si, C—Si Composites, or mixtures thereof; and a positive electrode material comprises lithium cobalt oxide, lithium iron phosphate, lithium nickel oxide, lithium manganese phosphate, lithium cobalt phosphate, MNC (LiMn(⅓)Co(⅓)Ni(⅓)O$_2$), NCA (Li(Ni$_{1-y-z}$Co$_y$Al$_z$)O$_2$), lithium manganese oxide, or mixtures thereof.

In one embodiment the multi-layer article hereof further comprises at least one metallic current collector in adhering contact with at least one of the first or second electrode materials. Preferably the multi-layer article hereof further comprises a metallic current collector in adhering contact with each the electrode material.

In another aspect, the invention provides an electrochemical cell comprising a housing having disposed therewithin, an electrolyte, and a multi-layer article at least partially immersed in the electrolyte; the multi-layer article comprising a first metallic current collector, a first electrode material in electrically conductive contact with the first metallic current collector, a second electrode material in ionically conductive contact with the first electrode material, a porous separator disposed between and contacting the first electrode material and the second electrode material; and, a second metallic current collector in electrically conductive contact with the second electrode material, wherein the porous separator comprises a nanoweb that includes a plurality of nanofibers wherein the nanofibers consist essentially of a fully aromatic polyimide. Ionically conductive components and materials transport ions, and electrically conductive components and materials transport electrons.

In one embodiment of the electrochemical cell hereof, the first and second electrode materials are different, and the electrochemical cell hereof is a battery, preferably a lithium ion battery. In an alternative embodiment of the electrochemical cell hereof the first and second electrode materials are the same and the electrochemical cell hereof is a capacitor, preferably an electronic double layer capacitor. When it is stated herein that the electrode materials are the same it is meant that they comprise the same chemical composition. However, they may differ in some structural component such as particle size.

In a further embodiment of the multi-layer article of the invention, at least one the electrode material is coated onto a non-porous metallic sheet that serves as a current collector. In a preferred embodiment, both electrode materials are so coated. In the battery embodiments of the electrochemical cell hereof, the metallic current collectors comprise different metals. In the capacitor embodiments of the electrochemical cell hereof, the metallic current collectors comprise the same metal. The metallic current collectors suitable for use in the present invention are preferably metal foils.

FIG. 1 depicts one embodiment of the article of the present invention. Referring to FIG. 1, the article of the invention therein depicted comprises a porous nanoweb separator, 1, consisting essentially of polyimide nanofibers consisting essentially of a fully aromatic polyimide, disposed between a negative electrode, 2, and a positive electrode, 3, each electrode being deposited on a non-porous conductive metallic foil, 4a and 4b respectively. In one embodiment, the negative electrode, 2, comprises carbon, preferably graphite, and the metallic foil 4a is copper foil. In another embodiment, the positive electrode, 3, is lithium cobalt oxide, lithium iron phosphate, or lithium manganese oxide and the metallic foil 4b is aluminum foil.

In one embodiment, the multi-layer article comprises
a first layer comprising a first metallic current collector;
a second layer comprising the first electrode material, in adhering contact with the first metallic current collector;
a third layer comprising the porous separator, in adhering contact with the first electrode material;
a fourth layer comprising the second electrode material, adheringly contacting the porous separator; and,
a fifth layer comprising a second metallic current collector, adheringly contacting the second electrode material.

In one embodiment, the first layer is copper foil and the second layer is carbon, preferably graphite. In another embodiment, the third layer is a nanoweb consisting essentially of nanofibers of PMDA/ODA. In another embodiment, the fourth layer is lithium cobalt oxide and the fifth layer is aluminum foil. In one embodiment, the first layer is copper foil, the second layer is carbon, preferably graphite, the third layer is a nanoweb consisting essentially of nanofibers of PMDA/ODA the fourth layer is lithium cobalt oxide and the fifth layer is aluminum foil.

Figure 2:
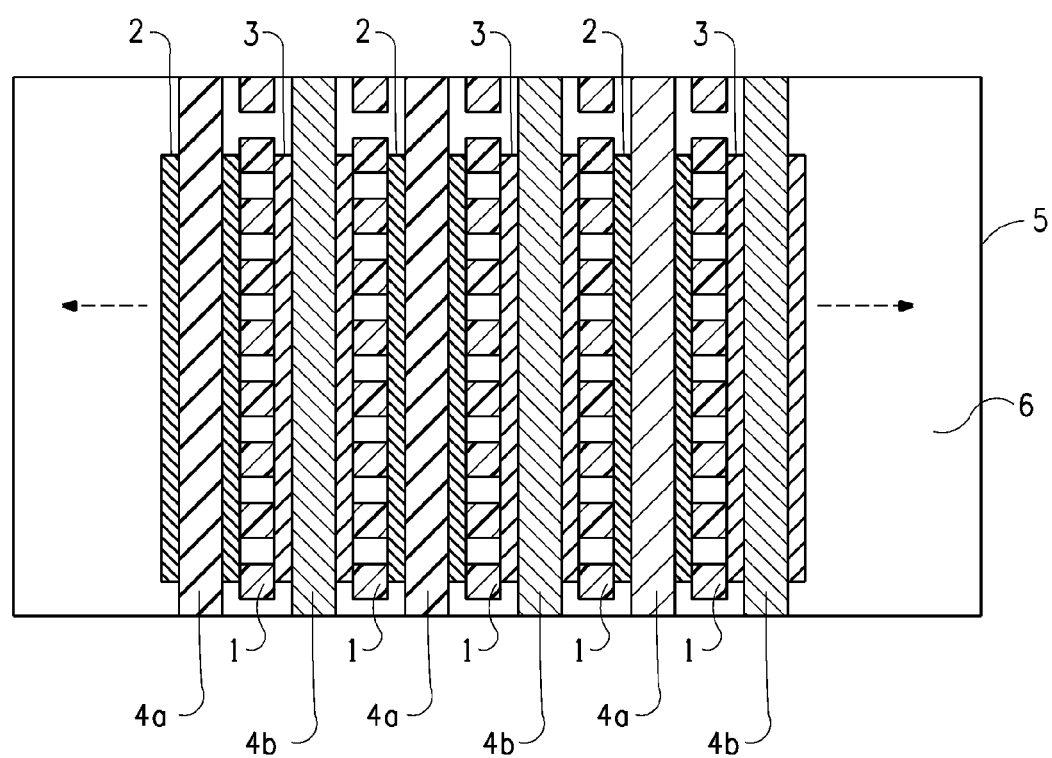
FIG. 2 is a schematic depiction of another embodiment of the multi-layer article hereof.

In a further embodiment, the foil is coated on both sides with the positive or negative electrode-active material. This permits the ready formation of a stack of arbitrary size—and voltage—by alternately layering the two sided foils with the separator, as depicted in FIG. 2. The stack so-depicted comprises a plurality of interconnected multi-layer articles of the invention as depicted in FIG. 1. Referring to FIG. 2, a plurality of porous polyimide nanoweb separators, 1, are stacked with alternating layers of negative electrodes, 2, and positive electrodes, 3. In one embodiment the negative electrode material, 2, is carbon, preferably graphite, deposited upon both sides of copper foil, 4a, and the positive electrode material, 3, is lithium cobalt oxide deposited upon both sides of aluminum foil, 4b.

Figure 3A:
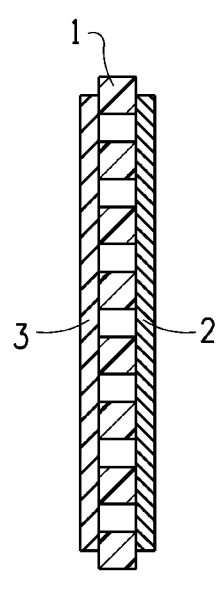
FIGS. 3a and 3b are schematic depictions of further embodiments of the multi-layer article of the invention.

An alternative embodiment of the article of the invention is shown in FIG. 3a. Referring to FIG. 3a, the article of the invention comprises the porous nanoweb separator suitable for use in the present invention, 1, consisting essentially of nanofibers of a fully aromatic polyimide, disposed between a negative electrode, 2, and a positive electrode, 3, each electrode being deposited directly upon opposite sides of the nanoweb. The electrode materials are deposited onto the nanoweb by methods such as are well known in the art including paste extrusion, printing. In one embodiment, the negative electrode comprises carbon, preferably graphite. In another embodiment the positive electrode comprises lithium cobalt oxide, lithium iron phosphate, or lithium manganese oxide, preferably lithium cobalt oxide.

Figure 3B:
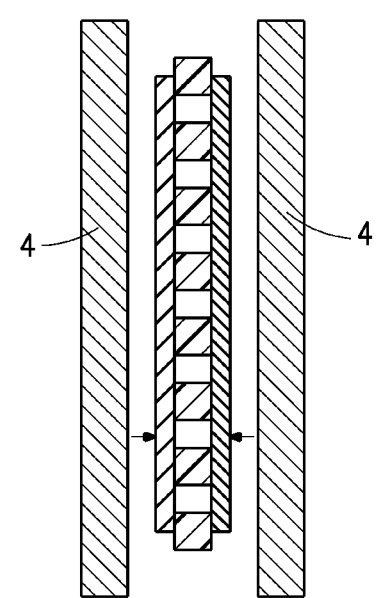

A further embodiment of the configuration of FIG. 3a is depicted in FIG. 3b wherein a layer of metallic foil, 4, is added to the structure of FIG. 3a, as shown. In a preferred embodiment, the multi-layer structure of FIG. 3b is subject to lamination to provide intimate surface to surface contact and adhesion among the layers.

Referring again to FIG. 2, the electrochemical cell of the invention is formed when the layered stack, shown in FIG. 2, is housed in a liquid-tight housing, 5, which can be a metallic "can," that contains a liquid electrolyte, 6. In a further embodiment the liquid electrolyte comprises an organic solvent and a lithium salt soluble therein. In a further embodiment, the lithium salt is $LiPF_6$, $LiBF_4$ or $LiClO_4$. In a still further embodiment, the organic solvent comprises one or more alkyl carbonates. In a further embodiment, the one or more alkyl carbonates comprises a mixture of ethylene carbonate and dimethylcarbonate. The optimum range of salt and solvent concentrations may vary according to specific materials being employed, and the anticipated conditions of use; for example, according to the intended operating temperature. In one embodiment, the solvent is 70 parts by volume ethylene carbonate and 30 parts by volume dimethyl carbonate and the salt is $LiPF_6$. Alternatively, the electrolyte salt may comprise lithium hexafluoroarsenate, lithium bistrifluoromethyl sulfonamide, lithium bis(oxalate)boronate, lithium difluorooxalatoboronate, or the $Li^+$ salt of polyfluorinated cluster anions, or combinations of these.

Alternatively, the electrolyte solvent may comprise propylene carbonate, esters, ethers, or trimethylsilane derivatives of ethylene glycol or poly(ethylene glycols) or combinations of these. Additionally, the electrolyte may contain various additives known to enhance the performance or stability of Li-ion batteries, as reviewed for example by K. Xu in *Chem. Rev.*, 104, 4303 (2004), and S. S. Zhang in *J. Power Sources*, 162, 1379 (2006).

With respect to the layered stack, the stack depicted in FIG. 2 can be replaced by the multi-layer article depicted in FIG. 1. Also present, but not shown, would be a means for connecting the respective negative and positive terminals of the cell to an outside electrical load or charging means. When the individual cells in the stack are electrically connected to one another in series, positive to negative, the output voltage from the stack is equal to the combined voltage from each cell. When the individual cells making up the stack are electrically connected in parallel, the output voltage from the stack is equal to the voltage of one cell. The average practitioner of the electrical art will know when a series arrangement is appropriate, and when a parallel.

Lithium ion batteries are available in a variety of forms including cylindrical, prismatic, pouch, wound, and laminated. Lithium-ion batteries find use in a variety of different applications (e.g. consumer electronics, power tools, and hybrid electric vehicles). The manufacturing process for lithium ion batteries is similar to that of other batteries such as NiCd and NiMH, but is more sensitive because of the reactivity of the materials used in Li-ion batteries.

The positive and negative electrodes in lithium ion cells suitable for use in one embodiment of the present invention are similar in form to one another and are made by similar processes on similar or identical equipment. In one embodiment, active material is coated onto both sides of a metallic foil, preferably Al foil or Cu foil, which acts as current collector, conducting the current in and out of the cell. In one embodiment, the negative electrode is made by coating graphitic carbon on copper foil. In one embodiment, the positive electrode is made by coating a lithium metal oxide (e.g. $LiCoO_2$) on Al foil. In a further embodiment, the thus coated foils are wound on large reels and are dried at a temperature in the range of 100-150° C. before bringing them inside a dry room for cell fabrication.

Figure 4:
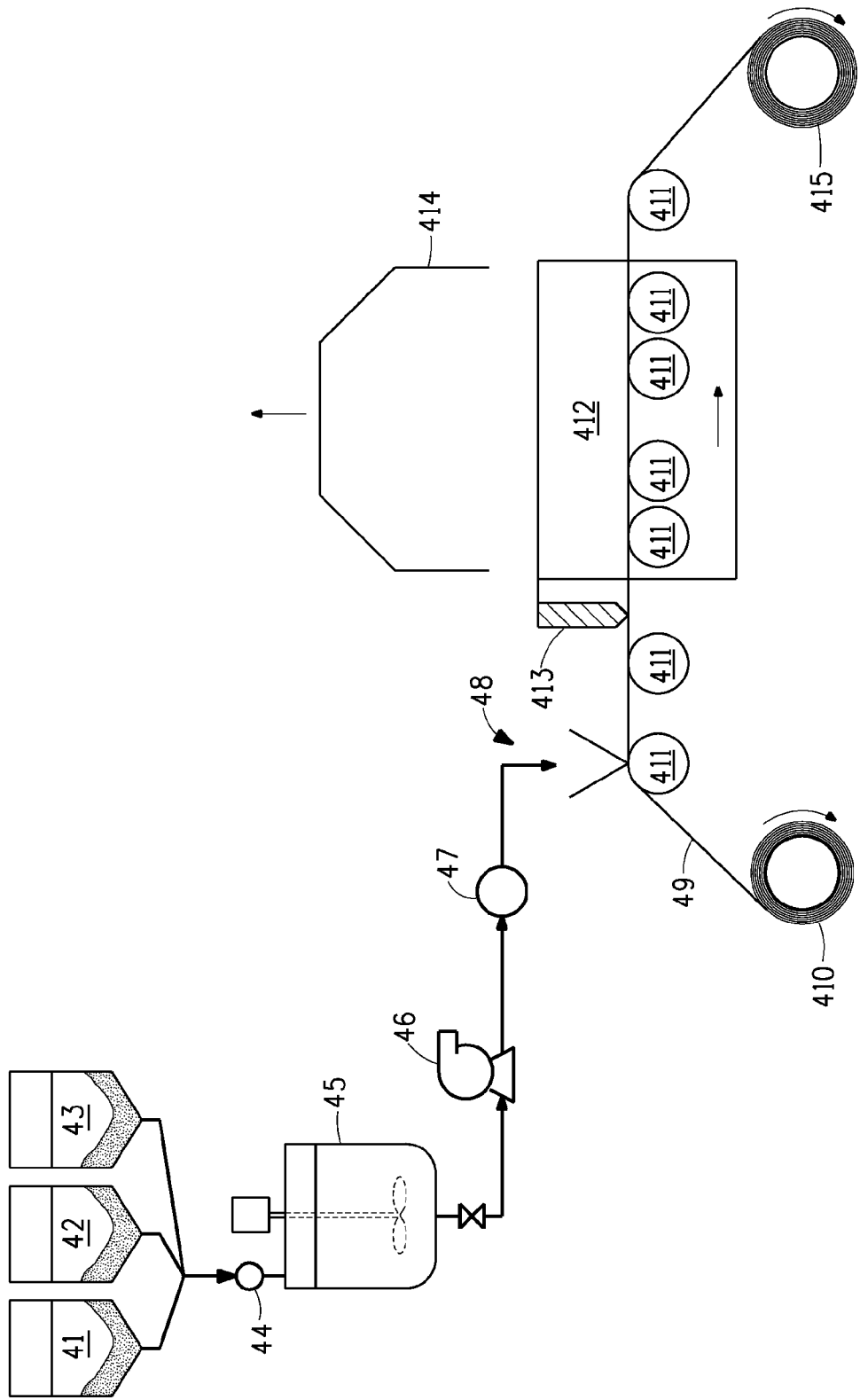
FIG. 4 is a schematic depiction of the process of assembly of one embodiment of the multi-layer article hereof.

Referring to FIG. 4a, for each electrode, the active material, 41, is combined with a binder solution, 42, and conductive filler, 43, such as acetylene black. The combination so formed is fed through a precision regulator, 44, to a mixing tank, 45, wherein the combination is mixed until it gives a homogeneous appearance. Suitable binders include but are not limited to poly(vinylidene fluoride) homopolymer and copolymer, styrene butadiene rubber, polytetrafluoroethylene, and polyimide. The thus formed slurry is then gravity fed or pressure fed to a pump, 46, which pumps the slurry through a filter, 47, and thence to a coating head, 48. The coating head deposits a controlled amount of the slurry onto the surface of a moving metal foil, 49, being fed from a feed roll, 410. The thus coated foil is conveyed by a series of rolls, 411, through an oven, 412, set at 100 to 150° C. A knife edge, 413, disposed at the entrance of the oven is positioned an adjustable distance above the foil; the thickness of the electrode formed thereby is controlled by adjusting the gap between the knife edge and the foil. In the oven, the solvent is volatilized, typically through a solvent recovery unit, 414. The thus dried electrode is then conveyed to a wind-up roll, 415.

The electrode thickness achieved after drying is typically in the range of 50 to 150 micrometers. If it is desired to produce a coating on both sides of the foil, the thus one-side coated foil is fed back into the coating machine, but with the uncoated side disposed to receive the slurry deposition. Following coating, the electrodes so formed are then calendered and optionally slit to narrow strips for different size batteries. Any burrs on the edges of the foil strips could give rise to internal short circuits in the cells so the slitting machine must be very precisely manufactured and maintained.

Figure 5:
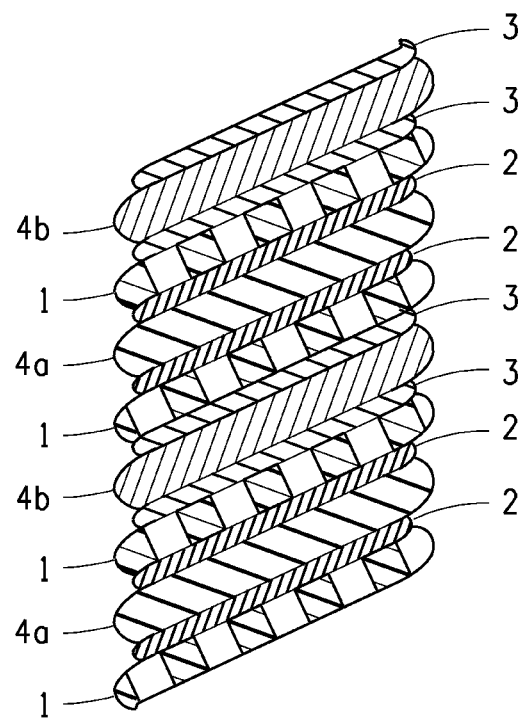
FIG. 5 is a schematic depiction of spiral wound embodiment of the multi-layer article hereof.

In one embodiment of the electrochemical cell of the invention, the electrode assembly hereof is a spiral wound structure used in cylindrical cells. A structure suitable for use in a spiral wound electrode assembly is shown in FIG. 5. In an alternative embodiment, the electrode assembly hereof is a stacked structure like that in FIG. 2, suitable for use in in prismatic cells. Prismatic cells can be made in wound form also. In the case of a prismatic cell, the wound cell is pressed to form a rectangular structure, which is then pushed inside a rectangular housing.

To form the cyclindrical embodiment of a Li-ion cell of the present invention, the electrode assembly is first wound into a spiral structure as depicted in FIG. 5. Then a tab is applied to the edge of the electrode to connect the electrode to its corresponding terminal. In the case of high power cells it is desirable to employ multiple tabs welded along the edges of the electrode strip to carry the high currents. The tabs are then welded to the can and the spirally wound electrode assembly is inserted into a cylindrical housing. The housing is then sealed but leaving an opening for injecting the electrolyte into the housing. The cells are then filled with electrolyte and then sealed. The electrolyte is usually a mixture of salt (LiPF6) and carbonate based solvents.

Cell assembly is preferably carried out in a "dry room" since the electrolyte reacts with water. Moisture can lead to hydrolysis of $LiPF_6$ forming HF, which can degrade the electrodes and adversely affect the cell performance.

After the cell is assembled it is formed (conditioned) by going through at least one precisely controlled charge/discharge cycle to activate the working materials. For most lithium ion chemistries, this involves creating the SEI (solid electrolyte interface) layer on the negative (carbon) electrode. This is a passivating layer which is essential to protect the lithiated carbon from further reaction with the electrolyte.

In one embodiment, the multi-layer article of the invention comprises a nanoweb that is an enhanced nanoweb as described infra. In another embodiment, the electrochemical cell hereof comprises a nanoweb separator that is an enhanced nanoweb as described infra. In one embodiment, an enhanced nanoweb is characterized by a crystallinity index of at least 0.2. In one embodiment, the enhanced nanoweb is an enhanced nanoweb consisting essentially of nanofibers of PMDA/ODA having a crystallinity index of at least 0.2.

In a further aspect of the invention, a method is provided for preparing a nanoweb wherein the nanoweb includes a plurality of nanofibers wherein the nanofibers consist essentially of a fully aromatic polyimide. The nanoweb prepared may be an enhanced nanoweb, by which is meant a nanoweb with higher strength, lower electrolyte solvent uptake, and reduced electrolyte solvent-induced loss in physical properties. In a preferred embodiment, the enhanced nanoweb hereof is characterized by a crystallinity index of at least 0.2. The term "crystallinity index" as it is employed herein is defined infra. When the enhanced nanoweb so prepared is employed as the separator as described supra in a lithium ion battery, it provides an enhanced level of safety. High strength and toughness is a vital characteristic in lithium ion batteries, as discussed supra. Retention of those properties in use—namely in the presence of electrolyte solvents—is just as important. While the nanoweb separators of the invention provide a superior degree of strength, toughness, and retention thereof upon solvent exposure, the enhanced nanoweb separators of the invention provide further improvements to the nanowebs consisting essentially of nanofibers of fully aromatic polyimides. While not limiting the invention, it is believed that the observed enhancement in properties is at least partially accounted for by the increase in crystallinity that is provided in the enhanced nanowebs hereof.

Lithium ion batteries that incorporate the nanoweb separators of the invention are superior in durability in regard to both thermal stress and mechanical shock over those of the art. Lithium ion batteries that incorporate the enhanced nanoweb separators of the invention are further improved.

The enhanced nanoweb separator of the invention is prepared by heating a nanoweb consisting essentially of nanofibers of a fully aromatic polyimide to a temperature within an annealing range and is made to exhibit enhanced crystallinity, strength, and reduced solvent uptake. The annealing range depends highly on the composition of the material. The annealing range is 400-500° C. for PMDA/ODA. For BPDA/RODA it is around 200° C.; BPDA/RODA will decompose if heated to 400° C. In general terms, in the process hereof the annealing range begins at least 50° C. above the imidization temperature thereof. For the purposes of the present invention, the imidization temperature for a given polyamic acid nanoweb is the temperature below 500° C. at which in thermogravimetric analysis, at a heating rate of 50° C./min, the % weight loss/° C. decreases to below 1.0, preferably below 0.5 with a precision of ±0.005% in weight % and ±0.05° C. According to the process hereof, the fully aromatic polyimide nanoweb is subject to heating in the annealing range for a period of time from 5 seconds to 20 minutes, preferably from 5 seconds to 10 minutes.

In one embodiment, a PMDA/ODA amic acid nanoweb produced by condensation polymerization from solution followed by electroblowing of the nanoweb, is first heated to ca. 100° C. in a vacuum oven with a nitrogen purge to remove residual solvent. Following solvent removal, the nanoweb is heated, preferably in an inert atmosphere such as argon or nitrogen, to a temperature in the range of 300-350° C. and held for a period of less than 15 minutes, preferably less than 10 minutes, more preferably less than 5 minutes, most preferably less than 30 seconds until at least 90% of the amic functionality has been converted (imidized) to imide functionality, preferably until 100% of the amic functionality has been imidized. The thus imidized nanoweb is then heated to a temperature in the range of 400-500° C., preferably in the range of 400-450° C., for a period of 5 seconds to 20 minutes, until a crystallinity index of 0.2 is achieved.

In another aspect, the invention provides an electrochemical double layer capacitor (EDLC). EDLCs are energy storage devices having a capacitance that can be as high as several Farads. Charge storage in double-layer electrochemical capacitors is a surface phenomenon that occurs at the interface between the electrodes, typically carbon, and the electrolyte. In double layer capacitors, the separator absorbs and retains the electrolyte thereby maintaining close contact between the electrolyte and the electrodes. The role of the separator is to electrically insulate the positive electrode from the negative electrode and to facilitate the transfer of ions in the electrolyte, during charging and discharging. Electrochemical double layer capacitors are typically made in a cylindrically wound design in which the two carbon electrodes and separators are wound together, separators having high strength are desired to avoid short-circuits between the two electrodes.

EXAMPLES

Test Methods

Crystallinity Index Method

The parameter "crystallinity index" as employed herein refers to a relative crystallinity parameter determined from Wide-Angle X-ray Diffraction (WAXD). X-ray diffraction data were collected with a PANalytical X'Pert MPD equipped with a Parabolic X-ray Mirror and Parallel Plate Collimator using Copper radiation. Samples for transmission geometry were prepared by stacking the thin films to a total thickness of approximately 0.7 mm. Data were collected over a range of two-theta of 3 to 45 degrees with a step size of 0.1 degree. Count time per data point was 10 seconds minimum with the sample rotating about the transmission axis at a rate of 0.1 revolutions per second.

The WAXD scan so generated consisted of three contributions: 1) a background signal; 2) scattering from ordered but amorphous regions; 3) scattering from crystalline regions. A polynomial background was fitted to the baseline of the diffraction data. The background function was chosen to be a third order polynomial in the two-theta diffraction angle variable. The background subtracted data was then least squares fitted with a series of Gaussian peaks which represented either ordered amorphous or crystalline components. Guided by experience with numerous samples of the same composition but widely differing in crystallinity, it was decided which peaks represented the crystalline regions. The ratio of the integral under the crystalline peaks so selected, to the integral under the overall scan curve with the background subtracted was the crystallinity index.

Peaks shown in Table 2 were obtained for PMDA-ODA polyimides.

Since the determination of which peaks are sufficiently sharp that they ought to be considered part of the crystalline phase is somewhat arbitrary, the absolute crystalline content of the sample is still unknown. However, the crystallinity index determined in this way allows us to compare the relative crystallinity of two polymers of the same polymer type.

TABLE 2

| WAXD (Two-theta degrees) |
| --- |
| 11.496 |
| 15.059 |
| 16.828 |
| 22.309 |

Determination of Degree of Imidization (DOI)

The infrared spectrum of a given sample was measured, and the ratio of the imide C—N absorbance at 1375 $cm^{-1}$ to the p-substituted C—H absorbance at 1500 $cm^{-1}$ was calculated. This ratio was taken as the degree of imidization (DOI). It has been found that a PMDA/ODA polyamic acid nanoweb that has been subject to imidization conditions for a time well in excess of that thought to be necessary to achieve maximum imidization exhibits a DOI of about 0.57 By comparison, a PMDA/ODA film sample had a DOI of 0.65. The difference may be attributable to sample effects, such as orientation in the nanofibers that is not present in the film.

For the purposes of the present invention, the DOI was calculated by taking the 1375/1500 $cm^{-1}$ peak ratio of 0.57 to represent a 100% imidized PMDA/ODA nanoweb. To determine % imidization of a given sample, the ratio of the 1375/1500 peaks was calculated as a percentage of 0.57.

The polyimide nanowebs hereof were analyzed by ATR-IR using a DuraSamplIR (ASI Applied Systems) accessory on a Nicolet Magna 560 FTIR (ThermoFisher Scientific). Spectra were collected from 4000-600 cm−1 and were corrected for the ATR effect (depth of penetration versus frequency).

Solvent Uptake

A 1 cm square specimen was placed horizontally on top of a piece of crumpled aluminum foil in a sealed, 20 mL scintillation vial, that contained 1.5 mL of a 70/30 (v/v) mixture of ethyl methyl carbonate and ethylene carbonate. The samples were thus suspended above the liquid mixture, and only allowed to contact solvent vapor. At the recorded time points, samples were removed from the vial, weighed quickly on a microbalance, and returned to the sealed vial.

Viscosity Determination

Solution viscosity was determined using a Brookfield Engineering HADV-II+ Programmable Viscometer equipped with an RV/HA/HB-5 or -6 spindle, and calibrated using NIST traceable silicone fluids. The spindle was immersed into the room temperature polymer solution until the liquid level reached the indent on the spindle. The motor was turned on with the RPMs set to produce 10-20% nominal torque. For solutions of 40-70 poise, it was found that 10-20 rpm was appropriate with the RV/HA/HB-5 spindle and 20 rpm was appropriate for HA/HB-6 spindle.

Fiber Size Determination

Nanofiber diameter was determined using the following method.

1. One or more SEM (Scanning Electron Microscope) images were taken of the nanoweb surface at a magnification that included 20–60 measurable fibers.
2. Three positions on each image were selected which appeared by visual inspection to represent the average appearance of the nanoweb.
3. Image analysis software was used to measure the fiber diameter of 60 to 180 fibers and calculate the mean from the selected areas.

Polymer Preparation

Poly(Amic Acid) Solution 1 (PAA-1)

43.13 lbs of PMDA (DuPont Mitsubishi Gas Ltd.) was combined in a 55 Gallon Ross VersaMixer stainless steel tank with 40.48 lbs of 4,4 ODA (Wakayama Seika) and 1.30 lbs of phthalic anhydride (Aldrich Chemical) in 353 lb of DMF. They were mixed and reacted while stirring for 26 hours at room temperature to form polyamic acid by first adding the ODA to the DMF, then adding the PMDA and finally adding the phthalic anhydride. The polyamic acid was then filtered using a 25 micrometer 7" metal leaf filter and placed into a freezer in 55 gallon drums. The resulting polyamic acid had a weight average molecular weight of 133, 097 Daltons as measured by GPC and a room temperature solution viscosity of 60 poise.

Poly(Amic Acid) Solution 2 (PAA-2)

33.99 kg of PMDA (DuPont Mitsubishi Gas Ltd.) was combined in a 100 Gallon stirred stainless steel reactor with 32.19 kg of 4,4 ODA (Wakayama Seika) and 1.43 kg of phthalic anhydride (Aldrich Chemical) in 215.51 kg of DMF (DuPont). They were mixed and reacted while stirring at room temperature for 30 hours to form polyamic acid by first adding the ODA to the DMF, then adding the PMDA and finally adding the phthalic anhydride. The resulting polyamic acid had a room temperature solution viscosity of 58 poise Poly(Amic Acid) Solution 3 (PAA-3)

53.87 g of PMDA (Aldrich Chemical) was combined in a laboratory stirred 1 L glass kettle with 50.46 g of 4,4 ODA (Aldrich Chemical) and 1.49 g of phthalic anhydride (Baker ACS) in 417.31 g of DMAC (Chromosolv Plus) to obtain a polyamic acid with a stoichiometry of 98% and 20% solids by weight. They were mixed and reacted, while stirring for 18 hours at room temperature to form polyamic acid by first adding the ODA to the DMAC, then adding the PMDA and finally adding the phthalic anhydride. The resulting polyamic acid had a room temperature solution viscosity of 88 poise.

Poly(Amic Acid) Solution 4 (PAA-4)

24.02 g of BPDA (Aldrich Chemical) was combined in a laboratory stirred 1 L glass kettle with 24.35 g of 4,4 RODA (1,3-phenylenedioxydianiline) (Aldrich Chemical) and 0.49 g of phthalic anhydride (Baker ACS) in 193.5 g of DMF (Chromosolv Plus). They were mixed and reacted, while stirring for 18 hours at room temperature to form polyamic acid by first adding the RODA to the DMF, then adding the BPDA and finally adding the phthalic anhydride. The resulting polyamic acid had a room temperature solution viscosity of 60 poise.

Poly(Amic Acid) Solutions 5-12 (PAA-5-PAA-12)

Several additional Poly(Amic Acid) Solutions were prepared from a variety of reactants using the equipment and procedures described for Poly(Amic Acid) Solutions 3 and 4. The reactants, molar ratios thereof, and percent solids for each polyamic acid solution so produced are shown in Table 3.

TABLE 3

| | Monomers (mole ratio) | | | | | | | Solvent & solids | | |
| | | | | | | | | | wt % | Viscosity |
| PAA- | PMDA | ODA | RODA | BPDA | DADPM | PPD | Phthalic Anhydride | DMF | DMAC | (poise) |
| --- | --- | --- | --- | --- | --- | --- | --- | --- | --- | --- |
| 3 | 0.98 | 1 | | | | | | | 20 | 88 |
| 4 | | | 1 | 0.98 | | | 0.04 | 20.0 | | 60 |
| 5 | 0.98 | 1 | | | | | 0.04 | 20.0 | | 27 |
| 6 | 0.982 | 1 | | | | | 0.036 | 19.3 | | 55 |
| 7 | | | | 0.98 | 0.5 | 0.5 | 0.04 | 23.0 | | 272 |
| 8 | | 1 | | 0.98 | | | 0.02 | 20.0 | | 460 |
| 9 | 0.98 | | 1 | | | | 0.04 | 20.0 | | 113 |
| 10 | 0.98 | 0.5 | | | | 0.5 | 0.04 | 20.0 | | 78 |
| 11 | | | | 0.98 | 0.5 | 0.5 | 0.04 | | 20.4 | 72 |
| 12 | 0.98 | | | | 0.5 | 0.5 | 0.04 | | 20.1 | 163 |

Comparative Polymers

Commercially available, solvent-soluble polyimides were employed for the production of comparative examples, infra. These were P84 and P84HT available from HP Polymers. P84 is a co-condensate of 2,4 TDI/2,6 TDI/MDI with BTDA. P84HT is a co-condensate of 2,4 TDI/2,6 TDI with BTDA/PMDA.

Nanoweb Preparation

Apparatus

Electrospinning is a well-known technology, described, for example, in *The Encyclopedia of Polymer Science and Technology*, DOI 10.1002/0471440264.pst554. It is found in the art of electrospinning that spinning becomes unstable and the fibers begin to "whip around". As a result of the whipping action, the fiber diameter is decreased to the desired range. The productivity of electrospinning is extremely low, typically in the range of ml per hour from a single spinning point. The technique of so-called electroblowing was introduced to attempt to remedy the productivity problem in electrospinning thin fibers. In electroblowing, a turbulent air flow is directed to the fibers as they are spun thereby forming a "cloud" of polymer fibers that is blown down onto the target surface as well as being electrostatically attracted. The combination of blowing and electrostatic forces greatly increases the productivity of the system. Electroblowing is described in detail in U.S. Published Patent Application 20050067732.

Figure 6:
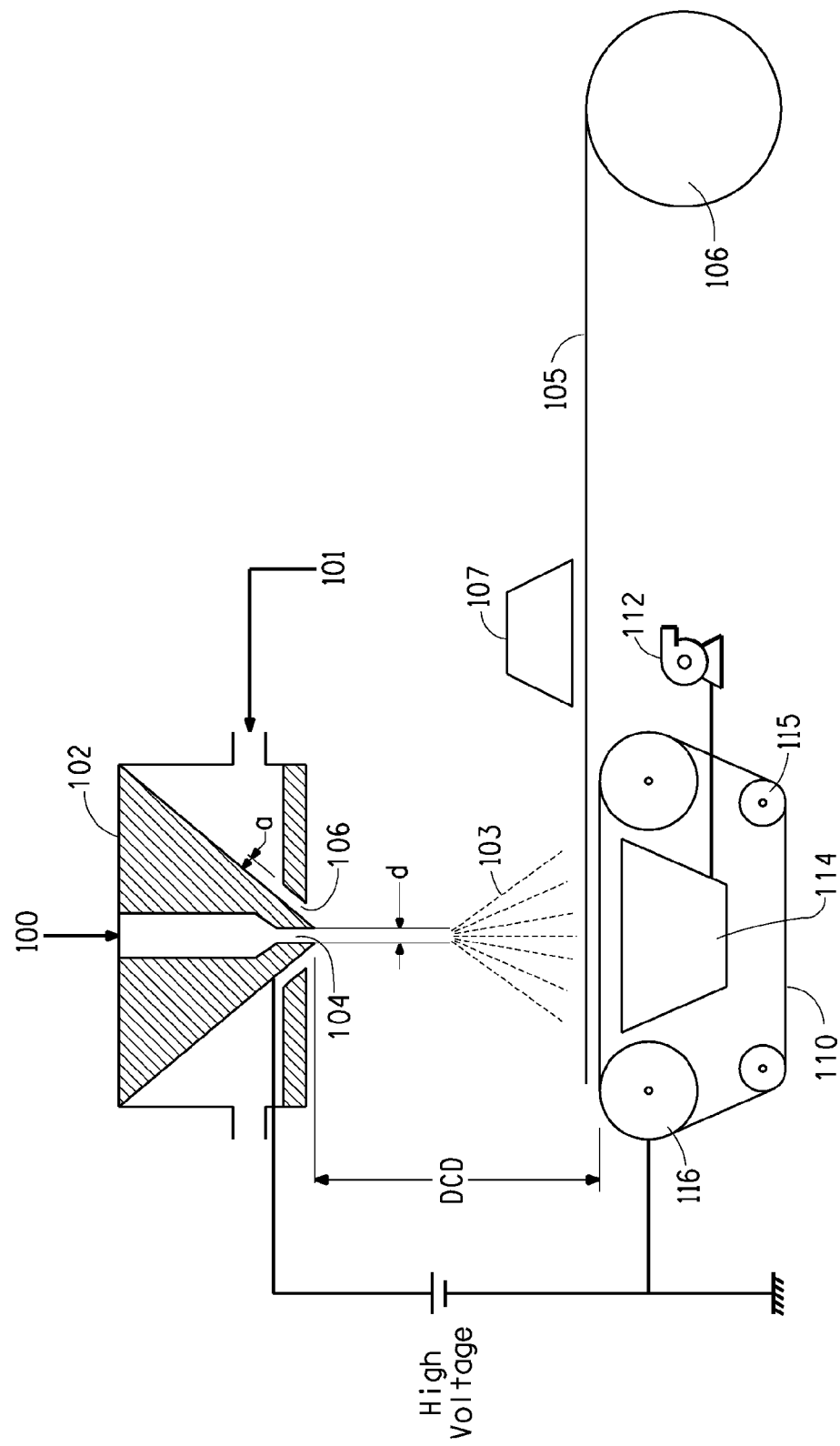
FIG. 6 is a schematic depiction of one suitable electroblowing apparatus.

Nanowebs were prepared from the poly(amic acid) solutions prepared supra by electroblowing. FIG. 6 depicts one embodiment of suitable electroblowing apparatus. In the process, PAA solution was pumped from drums into a stirred storage tank, not shown, through a 25 micrometer screen, not shown. The PAA solution from the storage tank was charged to a gear pump, not shown, using pressurized air, not shown. The gear pump then fed a spinning beam, 102, having 76 spinning nozzles arrayed in a 1 m wide spinnerette, with the nozzles spaced 1 cm apart. A DC voltage difference was applied between the spinneret and a grounded collector, 110. Compressed air from an air compressor which served as a process gas was passed through a heater, not shown, fed into the spinneret and ejected from the spinneret via air slots, 106, disposed in the sides of the knife edge of the spinneret containing the spinning nozzles. Each spinning nozzle was characterized by a diameter, d, of 0.25 mm, and a length of 2.5 mm. An air blower, 112, was connected by a length of tubing to a perforated air collecting table 114 to create a vacuum under a 1 m wide steel mesh conveyor, 110, driven by a roller, 116, and supported by 3 other turning rollers, 115. The fibers, 103, were both blown by the air and attracted by the electric potential to form a web, 105, on the surface of the steel mesh collector conveyor, 110. The web was passed through a hot air dryer, 107, and wound up on a winder, 106.

Figure 7:
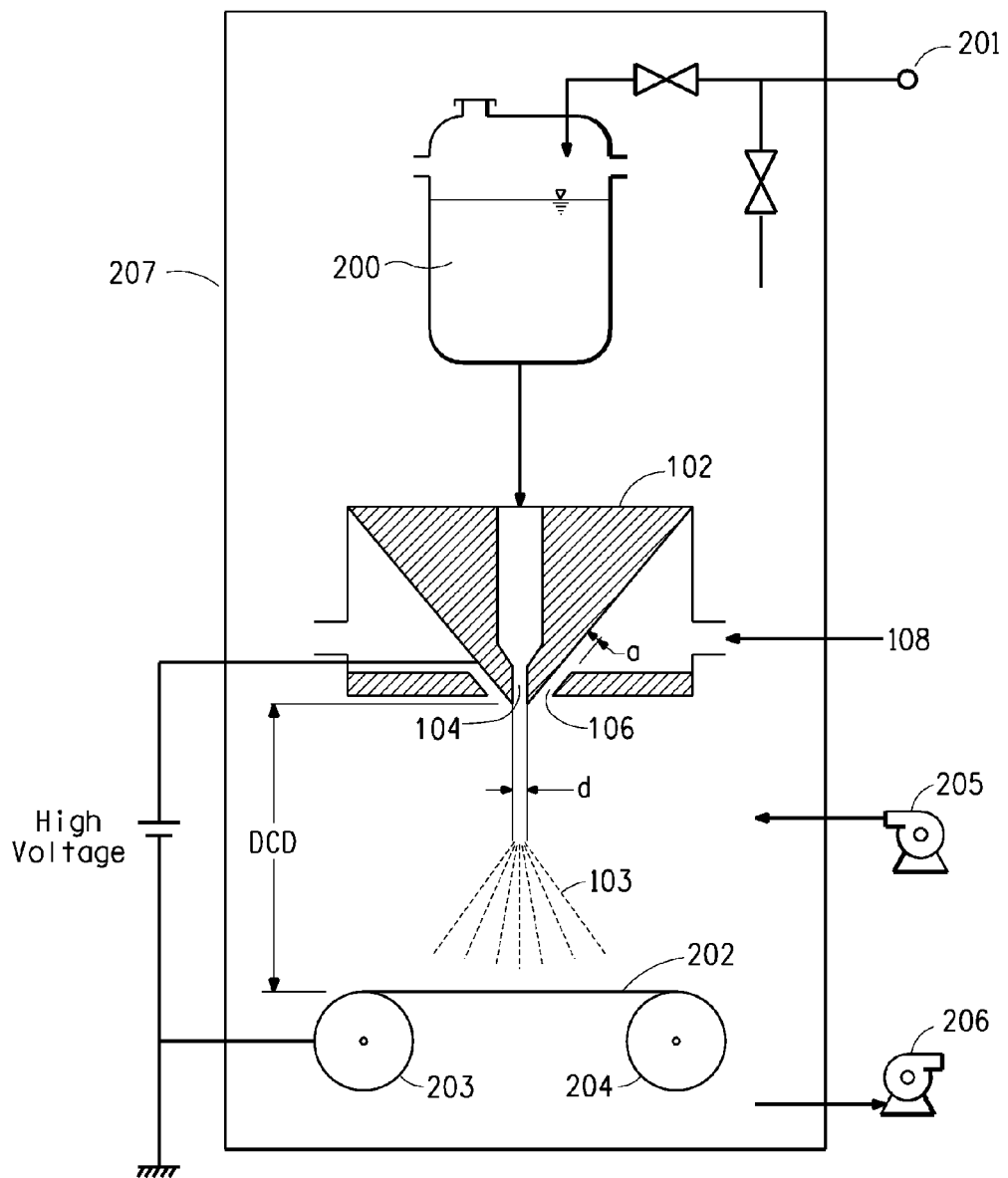
FIG. 7 is a schematic depiction an alternative suitable electroblowing apparatus.

A second electroblowing apparatus was depicted in FIG. 7. The polymer solution was manually loaded using a syringe, not shown, into a 250 ml Hoke cylinder, 200. A pressurized nitrogen supply, 201, was used to deliver the solution to a 10 cm wide spinneret, 102, having 3 nozzles each with a diameter of 0.38 mm and length 3.8 mm, arranged 1 cm apart, centered in the spinneret. Heated, compressed air, 108, was fed to the spinneret and was ejected through slots, 106. The fibers, 103, are both blown by the air and attracted by a DC voltage electric potential to a metallic plate collector, 202 which maintains the ground connection to a battery operated windup, 203, A roll of scrim material, 204 was mounted on the end of the plate collector. Heated, pressurized air, 205, also blown into a Plexiglas® enclosure, 207, containing the entire spinning apparatus. An exhaust blower, 206, was used to maintain atmospheric pressure inside the enclosure and to remove all evaporated solvent. The numbered parts that are common to both FIGS. 6 and 7 are the same in both.

Nanoweb Preparation

Nanoweb #1 (NW-1)

Referring to FIG. 6, 50 kg of PAA-1 was charged to the apparatus described and discharged from the spinning nozzles, 104, at a discharge pressure of 3.5 bar and a temperature of 39° C. Process gas was expelled at a velocity of 5,042 m/min at 69° C. from the slots, 106, with a gap, dimension "a", of 0.7 mm. The product was collected in the form of a web of nanofibers on the electrically grounded collector belt, 110. The distance from the nozzles to the collector was 30 cm. The applied potential difference was 85 kV.

The nanoweb, 105, was passed through a hot air dryer, 107, at 180° C. for 3 minutes. The thus dried nanoweb was then wound into a roll. The thus prepared polyamic acid nanoweb was then unwound, and then imidized by heating in a Glenro medium wavelength infrared oven to a temperature of about 325 C for 1½ minutes and rewound. The web was then unwound and calendered on a BF Perkins calender at a pressure of 1800 pounds per linear inch between a stainless steel calender roll and a cotton covered calender roll and then rewound.

Nanoweb #2 (NW-2)

50 kg of PAA-2—was charged to the apparatus depicted in FIG. 6. The solution was electroblown according to the process described in the preparation of NW-1, except that the solution was discharged from the spinning nozzle, 104, at a temperature of 37° C. The process gas was fed at 5,833 m/min and 72° C. from the slots, 106, with a gap, dimension "a", of 0.6 mm. thereby forming a nanoweb of polyamic acid fibers. The nanoweb was then manually unwound and cut with a manual rolling blade cutter into hand sheets approximately 12" long and 10" wide. The hand sheets were then, calendered at room temperature between a hard steel roll and a cotton covered roll at 1800 pounds per linear inch on a BF Perkins calender.

Nanoweb #3 (NW-3)

60 cc of PAA-3 was manually charged to the apparatus depicted in FIG. 7. The distance from the nozzle, 104, to the flat plate collector, 202, was 35.6 cm and the potential difference applied was between the nozzle and the belt was 110 kV. Solution discharge pressure was 32 psig, and process gas velocity was 4480 m/min at a temperature of 22° C. The auxiliary air supply, 205, was heated to 102° C. and blown into the fiber spinning chamber, 207, at a flow rate of 9 cubic feet per minute. The nanoweb structure was laid down on an aluminum foil scrim.

Nanowebs #4-13 (NW 4-13)

PAA-4-PAA-12 were employed in the preparation of nanowebs using the equipment and procedures employed in preparing NW-3. Specific ingredients and conditions are summarized in Table 4.

TABLE 4

| Polymer # | Spinning # | process gas temp C. | process gas flow cfm | process gas vel m/min | soln temp C. | solution feed pressure psi | aux air temp C. | aux air flow cfm | Quantity of solution cc |
|---|---|---|---|---|---|---|---|---|---|
| PAA-3 | NW-3 | 22 | 19 | 4480 | 24 | 32 | 102 | 9 | 50 |
| PAA-4 | NW-4 | 20 | 17 | 4009 | 24 | 40 | 100 | 14 | 50 |
| PAA-4 | NW-5 | 20 | 19 | 4480 | 26 | 40 | 70 | 34 | 50 |
| PAA-5 | NW-6 | 20 | 19 | 4480 | 20 | 20 | 103 | 14 | 60 |
| PAA-6 | NW-7 | 20 | 17 | 4009 | 25 | 110 | 114 | 12 | 50 |

TABLE 4-continued

| Polymer # | Spinning # | process gas temp C. | process gas flow cfm | process gas vel m/min | soln temp C. | solution feed pressure psi | aux air temp C. | aux air flow cfm | Quantity of solution cc |
|---|---|---|---|---|---|---|---|---|---|
| PAA-7 | NW-8 | 23 | 12 | 2830 | 27 | 150 | 115 | 12 | 30 |
| PAA-8 | NW-9 | 21 | 19 | 4480 | 27 | 120 | 70 | 19 | 30, 35, 35 |
| PAA-9 | NW-10 | 21 | 19 | 4480 | 26 | 60 | 70 | 19-24 | 50 |
| PAA-10 | NW-11 | 24 | 19 | 4480 | 28 | 65 | 70 | 34 | 50 |
| PAA-11 | NW-12 | 23 | 10 | 2358 | 24 | 35 | 70 | 10 | 30 |
| PAA-12 | NW-13 | 19 | 10 | 2358 | 22 | 50 | 70 | 10 | 30 |

Comparative Nanowebs A-D (CNW-A-D)

Nanowebs were further prepared from the non-fully aromatic comparative polymers, P84 and P84HT. These were designated CNW 1-3.

12.5 grams of P84HT polyimide 200 mesh powder (HP Polymer Inc.) were dried over night in a vacuum oven at 90° C., then dissolved in 50 ml of DMF at room temperature resulting in a 25 wt-% solids polyimide solution with solution viscosity of 43 poise. This solution was designated S-1

12.5 grams of P84 powder was similarly dried, then dissolved in 50 ml of DMF at room temperature, again resulting in a 25 wt-% solids polyimide solution with a viscosity of 43 poise, designated S-2

12.5 grams of P84 was similarly dried then dissolved in 50 ml of DMAC at room temperature, again resulting in a 25 wt-% solids polyimide solution viscosity not recorded, designated S-3

Each thus prepared polyimide solution was then manually loaded with a syringe into an electroblowing apparatus, employing the conditions and methods described in the preparation of NW-3. The nanoweb structure was laid down on a polyester scrim. Other parameters for each polymer solution are outlined in Table 5.

TABLE 5

| Polymer # | CNW | process gas temp C. | process gas vel m/min | air gap Mil | soln temp C. | solution feed pressure psi | aux air temp C. | aux air flow cfm | Quantity of solution cc |
|---|---|---|---|---|---|---|---|---|---|
| S1 | A | 20 | 3773 | 25 | 25 | 60-80-100 | 70 | 29 | 51 |
| S1 | B | 19 | 3773 | 25 | 24 | 60 | 70 | 34 | 50 |
| S2 | C | 10 | 4009 | 25 | 22 | 100 | 131 | 10 | 50 |
| S3 | D | 21 | 2358 | 20 | 25 | 50 | 70 | 8 | 25 |

The resulting webs were peeled from the scrim and manually cut into hand sheets approximately 12" long and 4" wide. The hand sheets were then dried in a convection oven allowed to cool, then calendered on a BF Perkins calender at a pressure of 1500 pounds per linear inch between a steel calender roll and a cotton covered calender roll. One of the CNW-B sheets were then reheated in a convection oven to a temperature of 400° C. for two minutes. See Table 6 for post processing settings.

TABLE 6

| Nanoweb # | Drying Temp (° C.) | Drying Time (min) | Annealing Temp. (° C.) |
|---|---|---|---|
| CNW-A | 200 | 30 | none |
| CNW-B | 200 | 2 | 400 |
| CNW-B | 200 | 2 | none |
| CNW-C | 200 | 2 | none |
| CNW-D | 180 | 5 | none |

Examples 1-4 and Comparative Example A

After imidization and calendering of the entire roll of NW-1. was complete, the IR oven was heated from 325° C. to 450° C. at a rate of approximately 8 c*/min. The calendered web was unwound, reintroduced into the oven at the start of heating thereby obtaining samples that were annealed at different temperatures, calculated from the initial temperature of 325° C. and the time elapsed when the sample was taken. These samples are shown in Table 7. The crystallinity index (C.I), degree of imidization (DOI), and % solvent uptake for each sample were determined using methods described supra. Results are shown in Table 7.

TABLE 7

| Example | Time Elapsed (min) | Approximate Maximum Temperature (° C.) | DOI | C.I. | Solvent Uptake (%) |
|---|---|---|---|---|---|
| 1 | 0.2 | 325 | 0.93 | 0.11 | 22.5 |
| 2 | 5.3 | 370 | 0.94 | 0.25 | 21.2 |
| 3 | 10.5 | 410 | 0.91 | 0.36 | 19.5 |
| 4 | 42 | 450 | 0.92 | 0.40 | 18.8 |

Example 4 was 37 micrometers thick with a basis weight of 17.3 grams per square meter; 67.5% porosity. Porosity was determined by dividing the weight of the sample by the sample dimensions to provide an apparent density. This density is compared to the known density of polyimide of 1.43 gm/cc. So, porosity (%)=100×(1−apparent density/1.43); Tensile strength was 21.8 MPa and Tensile Modulus was 979.7 MPa (per ISO 9073-3); Mean fiber diameter was 531 nanometers determined by examining a scanning electron microscope image and estimating the diameter of 100 fibers using image analysis software.

Three coin cells were prepared using each thus annealed specimen of NW-1.

Coin cells (type CR2032) were assembled from commercial parts (Pred Materials International, Inc., New York, N.Y. 10165) together with the following components: The negative electrode graphite on Cu foil, 60±3 µm thick (Japan Pionics Co. Ltd., Distributed by Pred Materials International), 1.5±0.1 mAh/cm$^2$ as disks ⅝" in diameter. The positive electrode was LiCoO$_2$ on Al foil, 60±3 µm thick (Japan Pionics Co. Ltd., Distributed by Pred Materials International), 1.5±0.1 mAh/cm$^2$ as disks 9/16" in diameter. The electrolyte solution was 1.0M LiPF$_6$ in a 2:1 by weight mixture of ethylene carbonate/ethyl methyl carbonate (Ferro), was stored and dispensed in an Ar glove box.

Porous polyolefin (Celgard LLC, Charlotte, N.C. 28273) as disks 11/16" in diameter was used as a comparative example to represent a current commercial separator.

The cell hardware were dried overnight at 90° C. under reduced pressure and transferred into an Ar-filled glove box for storage, filling and assembly. The cells were assembled with two layers of separator inserted between negative electrode and positive electrode, filled with electrolyte solution, sealed by means of a crimped polyolefin gasket and removed from the glove box.

Cells testing was performed at ambient temperature by means of a Maccor Series 4000 battery tester (Maccor, Inc. Tulsa, Okla. 74107). Each cell was first subjected to six formation cycles between 2.7 and 4.2V at 0.25 mA with a 10 minutes rest period between each half cycle, followed by 250 cycles of charging at 1.0 mA and discharging at 2.5 mA with a 10 minutes rest period between each half cycle. For each cycle the capacities for charging and discharging (in mAh) was recorded. Results are shown in Table 8.

TABLE 8

| Example | 1st Charge mAh | 1st Discharge mAh | 1st Cylce Cap. Loss | 5th Disch. mAh |
|---|---|---|---|---|
| 1-1 | 3.10 | 2.73 | 11.9% | 2.69 |
| 1-2 | 2.97 | 2.61 | 12.0% | 2.56 |
| 1-3 | 2.86 | 2.44 | 14.7% | 2.44 |
| 2-1 | 2.97 | 2.60 | 12.4% | 2.53 |
| 2-2 | 2.90 | 2.55 | 12.1% | 2.49 |
| 2-3 | 2.99 | 2.61 | 12.6% | 2.55 |
| 3-1 | 2.94 | 2.57 | 12.7% | 2.50 |
| 3-2 | 2.96 | 2.59 | 12.4% | 2.57 |
| 3-2 | 2.97 | 2.59 | 12.7% | 2.52 |
| 4-1 | 3.01 | 2.64 | 12.4% | 2.56 |
| 4-2 | 2.81 | 2.45 | 12.8% | 2.38 |
| 4-3 | 2.96 | 2.58 | 12.8% | 2.52 |

Example 5

Following the preparation of NW-2, the dried and calendered, but not yet imidized, nanoweb specimens of PAA nanofibers were then heated by placing the sample on a metal tray lined with Kapton® film and then placing the tray with the sample on it in a laboratory convection oven preheated to temperatures ranging from 200° C. to 475° C. for 2 minutes The mean fiber diameter from the sample heated at 475 C for 2 minutes was 707 nm and the porosity was 50.5%. The sample with no additional heating had a mean fiber diameter of 775 nm and a porosity of 50.8%

Figure 8:
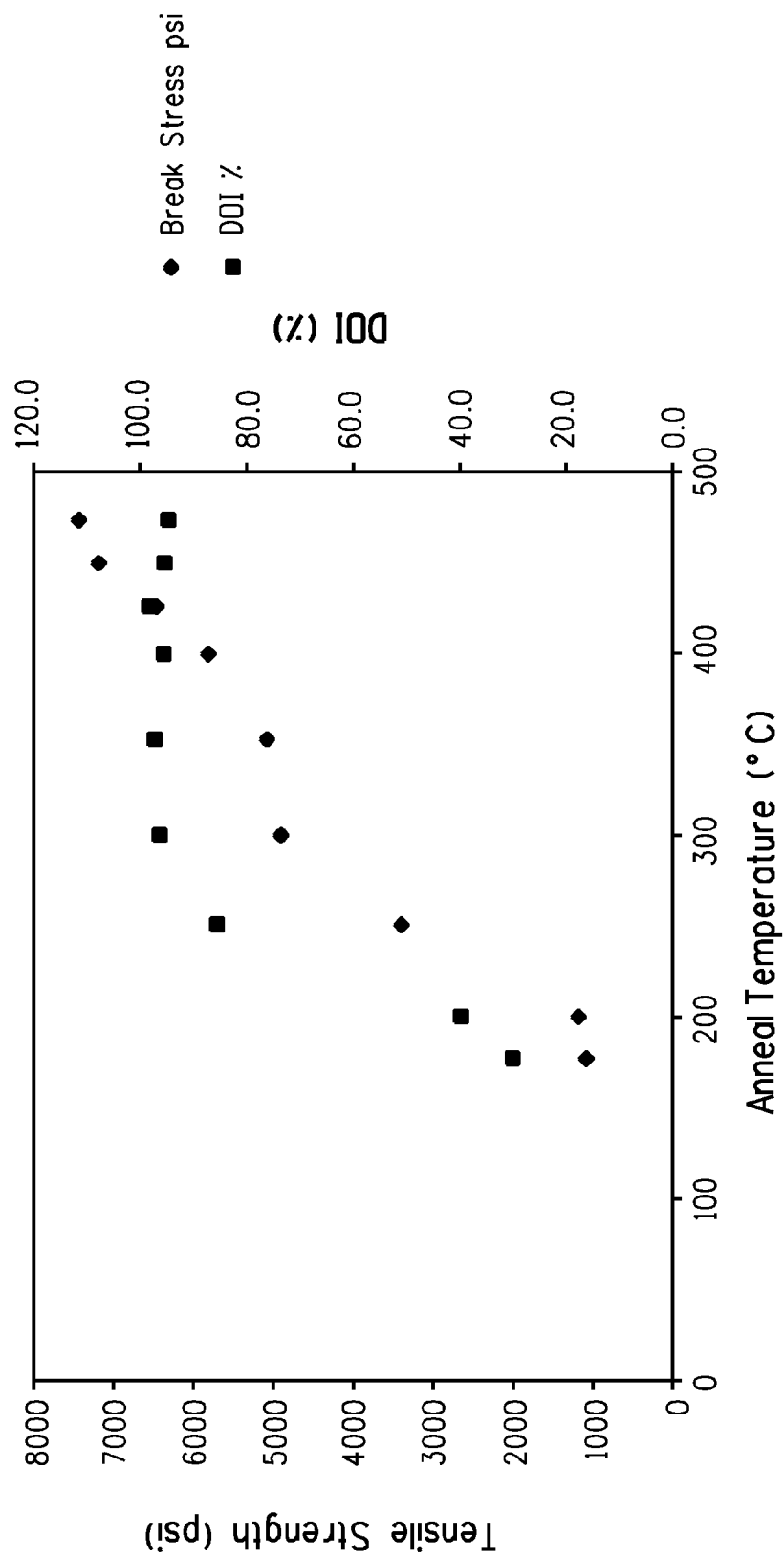
FIG. 8 is a graphical depiction of a comparison between the degree of imidization and the tensile strength vs. temperature for the specimens prepared in Example 5.
Figure 9:
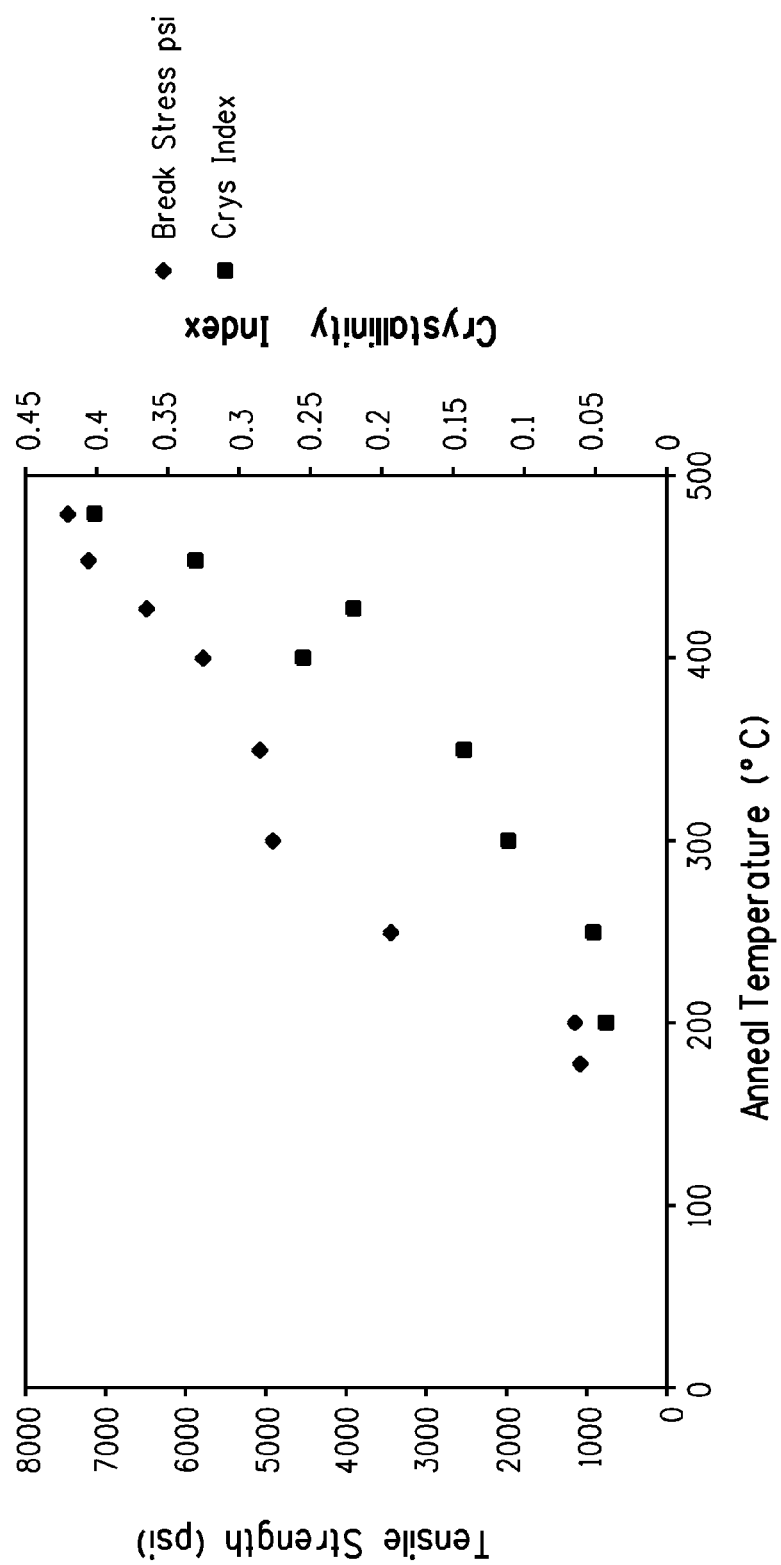
FIG. 9 is a graphical depiction of a comparison between the tensile strength and the crystallinity index vs. temperature for the specimens prepared in Example 5.

Degree of imidization (DOI), crystallinity index (C.I.) and tensile strength (ISO 9073-3) were also measured. Results are shown in Table 9 and depicted graphically in FIGS. 8 and 9.

TABLE 9

| Example | Anneal Temp C. | Tensile (psi) | DOI (%) | C.I. | Basis Wt gsm |
|---|---|---|---|---|---|
| 5-1 | 180 | 1077 | 29.3 | 0.06 | 18.4 |
| 5-2 | 200 | 1193 | 39.5 | 0.04 | 18.1 |
| 5-3 | 250 | 3441 | 84.4 | 0.05 | 17.5 |
| 5-4 | 300 | 4841 | 96.5 | 0.11 | 17 |
| 5-5 | 350 | 5047 | 97.9 | 0.14 | 16.3 |
| 5-6 | 400 | 5793 | 95.8 | 0.25 | 16 |
| 5-7 | 425 | 6461 | 98.6 | 0.22 | 16 |
| 5-8 | 450 | 7167 | 95.1 | 0.33 | 16 |
| 5-9 | 475 | 7427 | 94.4 | 0.4 | 16 |

These experiments showed that while imidization appeared to have been completed by heating for 2 minutes at 300° C., crystallinity and breaking strength steadily increased with annealing temperature from 300° C. to 450° C.

Examples 6-11 and Comparative Examples AA-EE

Nanowebs #3, 5, 7, 8, 9, 10, and 11, were dried in an air convection oven at 200° C. for 2 minutes. They were then subject to calendering, imidization, and annealing according to the conditions shown in Table 10.

TABLE 10

| Nano web # | Calendering pressure (pli) | Before/After Imidization | Imidization Temp. ° C. | Imidization time (min) | Annealing Temp. (° C.) | Annealing time (min) |
|---|---|---|---|---|---|---|
| 3 | 1500 | Before | 350 | 2 | 450 | 2 |
| 5 | 1500 | Before | 220 | 30 | na | Na |
| 7 | 1500 | Before | 350 | 2 | 450 | 2 |
| 8 | 1500 | Before | na | na | na | Na |
| 9 | 750 | After | 275 | 10 | na | Na |
| 10 | 1500 | Before | 350 | 2 | 450 | 2 |
| 11 | 1500 | Before | 350 | 2 | 450 | 2 |

The thus processed nanowebs, as well as CNW-B and CNW-D were incorporated into coin cells following the method and using the equipment employed in Examples 1-4; first formation cycle irreversible capacity loss was determined. These are also compared to a Celgard® commercially available separator. The results are shown in Table 11. Table 11 also shows the % solvent uptake after 1300 hours of exposure to the mixed vapors of ethylene carbonate and dimethyl carbonate.

TABLE 11

| Example | Web # | Polymer | Annealing Temp. (° C.) | 1st Cycle Cap. Loss (%) | # of cells tested | Solvent Uptake (%) |
|---|---|---|---|---|---|---|
| 6 | NW-3 | PMDA/ODA | 450 | 12.1 | 4 | Not tested |
| 7 | NW-7 | PMDA/ODA | 450 | 14.5 | 8 | 20.3 |
| 8 | NW-9 | BPDA/ODA | 275 | 14.6 | 6 | 16.9 |
| 9 | NW-5 | BPDA/RODA | 220 | 13.3 | 5 | 13.8 |
| 10 | NW-10 | PMDA/RODA | 450 | 13.1 | 5 | 10.3 |
| 11 | NW-11 | PMDA/ODA/PPD | 450 | 15 | 8 | Not tested |
| Comp. Ex. AA | NW-8 | BPDA/DADPM/PPD | 450 | 13.8 | 1 | 26 |
| Comp. Ex. BB | CNW-D | P84 | 180 | 17 | 6 | 60.8 |
| Comp. Ex. CC | CNW-B | P84HT | 200 | 20 | 5 | 56.4 |
| Comp. Ex. DD | NA | Celgard | NA | 12.8 | 3 | Not tested |
| Comp. EX. EE | CNW-B | P84HT | 200 | | | 51.9 |

Examples 12, Comparative Examples FF and JJ

One 8.5×10 inch sample of NW-1, and two 8.5×10 inch samples of CNW-B were cut. One of the CNW-B samples was annealed at 400° C. for 2 minutes; and, the NW-1 sample was annealed at 450° C. for 2 minutes. 5 mm×60 mm specimens were cut from each of the nanowebs so prepared and the breaking strength thereof was determined. Breaking strength was determined by clampling the samples to a spring scale on a lab bench, followed by manually pulling the other end of the sample until it broke. The breaking strength was calculated by dividing the load to break by the cross-sectional area.

A further four 5 mm×60 mm specimens from each nanoweb were immersed in a solution of ethyl methyl carbonate and ethylene carbonate (70/30, v/v) for a period of one week seven days at room temperature, after which they were rinsed copiously with deionized water and dried at 100° C. for 16 hours in a nitrogen-purged vacuum oven. The breaking strength was again determined. The Results are summarized in Table 12. Each data point represents the average of four determinations.

TABLE 12

| | Before Electrolyte Contact | After Electrolyte Contact | Anneal Temp |
|---|---|---|---|
| Ex. 12 (PMDA/ODA) | 345.2 kg/cm² | 330.0 kg/cm² | 450° C. |
| Comp. Ex FF (P84 HT 400 C) | 127.7 kg/cm² | 14.82 kg/cm² | 400° C. |
| Comp. Ex JJ (P84 HT) | 39.45 kg/cm² | 5.002 kg/cm² | Not annealed |

Figure 10:
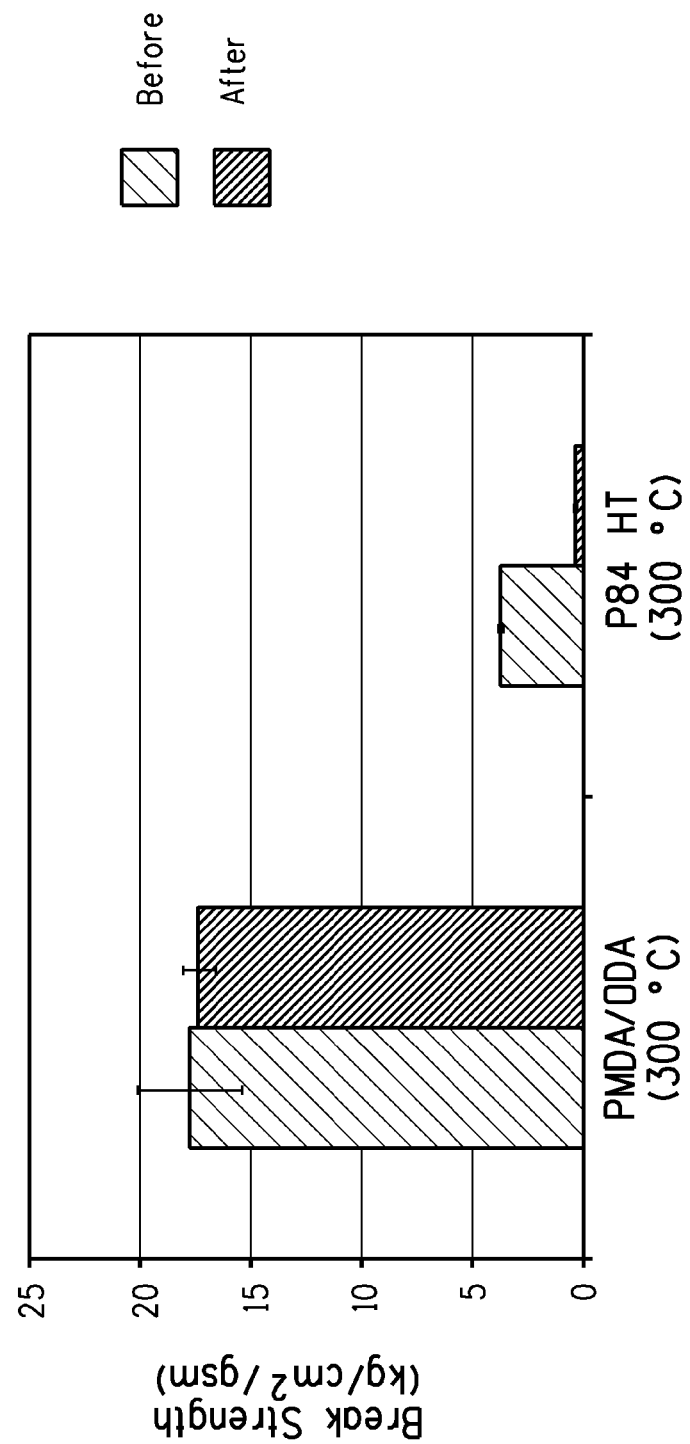
FIG. 10 is a bar graph showing the effect of solvent exposure on the tensile strength of a sample of Example 13 vs. that on Comparative Example CNW-B.

Example 13 and Comparative Example KK 8.5"×10" sheets of CNW-B and NW-2 were annealed at 300° C. for 2 minutes. The degree of imidization of the thus-treated NW-2 sample was determined to be 96.5%. The thus heated samples were cut into 5×60 mm strips. The breaking strength of four strips of each sample was determined using the spring balance method, described supra. Four additional strips of each sample were immersed in a solution of ethyl methyl carbonate (TCI) and ethylene carbonate (Sigma Aldrich) (70/30, v/v) for a period of 48 hrs, in a sealed scintillation vial after which they were rinsed copiously with deionized water and dried at 105° C. for 2 hours in a vacuum oven with $N_2$ purge. Breaking strength of the thus solvent treated specimens was then determined. The Results are summarized in Table 13 and FIG. 10. Each data point represents the average of four determinations. Table 13 displays the breaking load, thickness, and basis weight for the two nanowebs before and after solvent exposure.

TABLE 13

| | Before Electrolyte Contact | After Electrolyte Contact | Anneal Temp |
|---|---|---|---|
| Ex. 13) | 18.0 kg/cm²/gsm | 17.4 kg/cm²/gsm | 300° C. |
| Comp. Ex CNW-B | 3.63 kg/cm²/gsm | 0.290 kg/cm²/gsm | 300° C. |

Example 14

Figure 11:
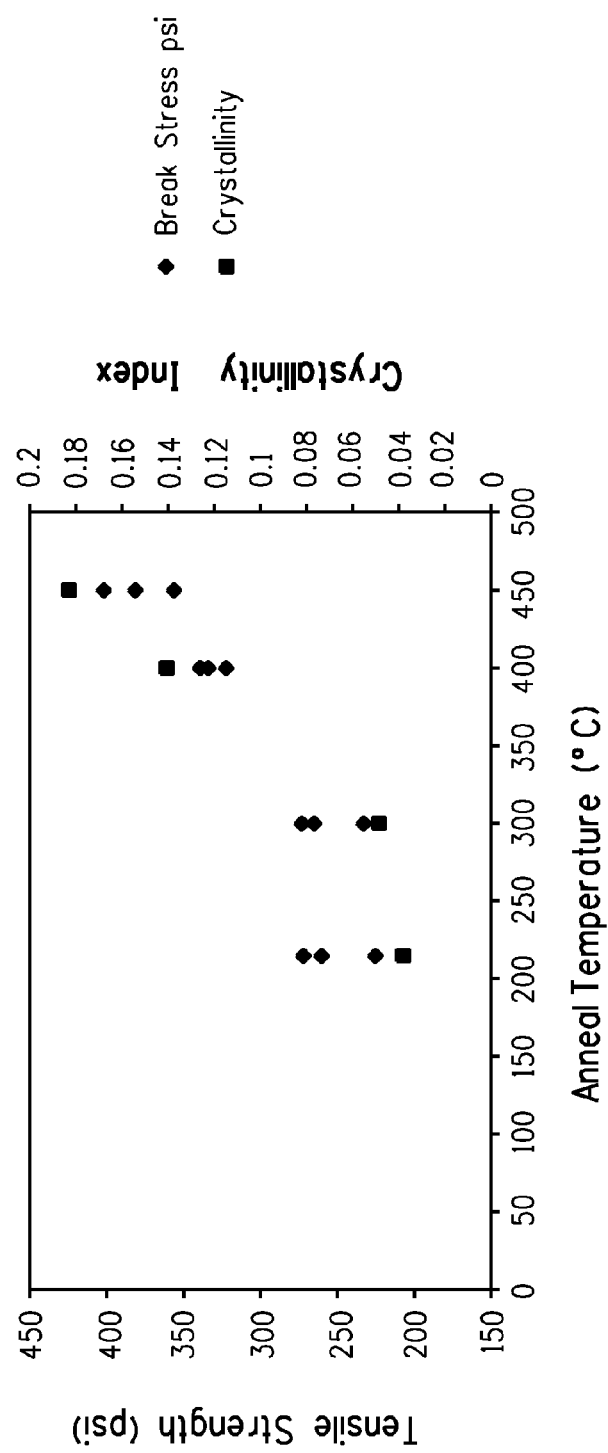
FIG. 11 is a bar graph showing the relationship between breaking strength and crystallinity index for the samples of Example 14.

Four 8.5"×10" sheets of BPDA/RODA samples were heated in an air convection oven at 200° C. for 2 minutes and 220° C. for 30 minutes, and were subsequently calendered at 1500 pli between cotton and metal calendar rolls. After calendering, the samples were then annealed in an air convection oven for two minutes at temperatures ranging from 300-450° C. Crystallinity index for each sample was determined according to the method supra. Break strength was determined on 6×0.5 cm strips that were pulled until breaking using a hand scale, and the force required to break each sample was recorded. FIG. 11 and Table 14 show a correlation between break strength and crystallinity in these samples.

TABLE 14

| Example | Anneal Temp C. | Break Stress Kg/cm² | Crys Index |
|---|---|---|---|
| 14-1 | 220 | 253 | 0.04 |
| 14-2 | 300 | 255 | 0.05 |
| 14-3 | 400 | 330 | 0.14 |
| 14-4 | 450 | 378 | 0.18 |

Example 15

Preparation of an Electronic Double Layer Capacitor

NW-3, which had been imidized at 350° C. for 2 minutes and then annealed at 450° C. for 2 minutes, exhibited the properties shown in Table 15.

TABLE 15

| | |
|---|---|
| Basis weight (gsm) | 14 |
| Thickness (um) | 22 |
| Porosity (%) | 57 |
| Gurley (sec) | 7.75 |
| Tensile Break Strength (Kg/cm2) | 311 |
| Modulus (Kg/cm2) | 3743 |

Coin Cell Assembly

The case, cap, gaskets, wave springs, and spacer disk for a type 2032 coin cell (Hohsen Corp., Osaka Japan via Pred Materials, New York, USA.) were stored in a glovebox (Vacuum Atmosphere Company, Hawthorne, Calif.) operated with an Argon atmosphere. Two 0.625 inch diameter commercial grade carbon-coated (activated carbon with PTFE binder) aluminum foil electrodes were punched out of a sheet thereof. The electrode disks so prepared were dried at 90° C. for 18 hrs in a vacuum oven (Neytech, Model Number 94-94-400). Two 0.75 inch diameter disks were punched out of an 8 in×10 in sample of NW-3, and then dried at 90° C. for 18 hrs in the Neytech vacuum oven. Electrolyte solution (Digirena® 1 M tetraethyl ammonium tetrafluoroborate in acetonitrile) was obtained from Honeywell (Morristown, N.J.).

The coin cell was assembled inside the glove box. The PP gaskets were pushed into the top cap. A first carbon electrode disk was placed in the coin cell case and four drops of electrolyte were added using a plastic pipette. Two layers of the NW-3 disks were then placed on top of the wet electrode, followed by a second carbon electrode. Four drops of the electrolyte were added to the second electrode. A spacer disk was placed on the second carbon electrode followed by the wave spring and gasketed cap. The thus assembled coin cell was crimped using an automated coin cell crimper (Hohsen Corporation, Model No HSACC-D2032). Excess electrolyte was wiped off the exterior of the coin cell, and the cell was removed from the glove box for further conditioning and electrochemical testing.

Cell Testing

The 2032 coin cell electronic double layer capacitors are tested by cycling them between 1.0 V and 2.5V at 10 mA current for 5 cycles. All the cycling tests (constant current charging at 10 mA followed by constant current discharging at 10 mA, separated by 15 minute rest steps) were done using a Maccor 32 channel cycler (model 4000). The charge and discharge capacitance for cycle number 4 and 5 are shown in Table 16.

TABLE 16

| Cycle Number | Charge Capacitance (F.) | Discharge Capacitance (F.) |
|---|---|---|
| Four | 2.605 | 2.573 |
| Five | 2.760 | 2.570 |

We claim:

1. A multi-layer article comprising a first electrode material, a second electrode material, and a porous separator disposed between and in contact with the first and the second electrode materials, wherein the porous separator comprises a nanoweb that comprises a plurality of nanofibers wherein the nanofibers consist essentially of a fully aromatic polyimide and wherein the fully aromatic polyimide is characterized by a crystallinity index of 0.2 or greater.

2. The multi-layer article of claim 1 wherein the fully aromatic polyimide comprises PMDA/ODA.

3. The multi-layer article of claim 1 wherein the first electrode material, the separator, and the second electrode material are in mutually adhering contact in the form of a laminate.

4. The multi-layer article of claim 1 further comprising at least one metallic current collector in adhering contact with at least one of the first or second electrode materials.

5. The multi-layer article of claim 4 further comprising
a first layer comprising a first metallic current collector;
a second layer comprising the first electrode material, in adhering contact with the first metallic current collector;
a third layer comprising the porous separator, in adhering contact with the first electrode material;
a fourth layer comprising the second electrode material, adheringly contacting the porous separator; and,
a fifth layer comprising a second metallic current collector, adheringly contacting the second electrode material.

6. The multi-layer article of claim 5 wherein the first metallic current collector comprises copper foil, the first electrode material comprises carbon, the fully aromatic polyimide comprises PMDA/ODA, the second electrode material comprises lithium cobalt oxide, and the second metallic current collector comprises aluminum foil.

7. The multi-layer article of claim 1 wherein the first and second electrode materials are the same material.

8. The multi-layer article of claim 1 wherein the first and second electrode materials are different material.

9. The multi-layer article of claim 5 wherein the first and second electrode materials are the same material.

10. The multi-layer article of claim 5 wherein the first and second electrode materials are different material.

11. The multi-layer article of claim 5 wherein the first and second metallic current collectors comprise aluminum foil; the first and second electrode materials comprise carbon; and the fully aromatic polyimide comprises PMDA/ODA.

* * * * *